United States Patent [19]

Short

[11] 4,257,296
[45] Mar. 24, 1981

[54] SHEAR BACK-GAUGING SYSTEM

[75] Inventor: Wilbur G. Short, Browns, Ill.

[73] Assignee: Canron Corp., Oakland, Calif.

[21] Appl. No.: 673,873

[22] Filed: Apr. 5, 1976

[51] Int. Cl.³ .............................................. B26D 7/01
[52] U.S. Cl. ........................................ 83/393; 83/269; 83/467 A
[58] Field of Search .............. 83/391, 393, 394, 212, 83/269, 392, 395, 467 R, 467 A

[56] References Cited

U.S. PATENT DOCUMENTS

| 128,817 | 7/1872 | Schoettle | 83/394 |
|---|---|---|---|
| 450,147 | 4/1891 | Gili | 83/393 |
| 1,892,327 | 12/1932 | Buccicone et al. | 83/394 X |
| 1,923,129 | 8/1933 | Walker | 83/394 |
| 2,125,539 | 8/1938 | Brownlee | 83/467 A |
| 2,204,736 | 6/1940 | Straubel | 83/394 X |
| 2,222,095 | 11/1940 | Van Dusen | 83/395 |
| 3,115,801 | 12/1963 | Pearson et al. | 83/393 X |

Primary Examiner—John Sipos
Attorney, Agent, or Firm—Edward Brosler; Merwyn Brosler

[57] ABSTRACT

A back-gauging system for a shear machine that derives support from the side housings of the machine and is designed with a rotatable movement gauge stop and slideable control guides to enable the gauge stop to be moved above the work plane for shearing work pieces longer than the maximum gauge range, to eliminate excessive force being transmitted to the gauge drive when gauging or shearing and to eliminate wedging of sheared pieces between the knives and the back-gauge stop.

6 Claims, 7 Drawing Figures

SHEAR BACK-GAUGING SYSTEM

The invention relates primarily to shear machines or the like, and more particularly to an adjustable back-gauging system or assembly for use in connection therewith.

In previous back-gauge assemblies, especially those where the back-gauge assembly is attached to the upper knife holder or ram, the assembly must be rotated with the upper knife holder whenever the rake angle is changed. This dictates a back-gauge stop of a tapered design to accommodate the various rake angles available to the shear and when so mounted causes a variable eccentric load to be applied to the ram.

Also, when shearing small distortable pieces, there is a tendency for the sheared piece to become wedged between the lower knife and the back-gauge stop. In this type of situation, it becomes necessary to withdraw the stop to release the piece.

Among the objects of my invention are:

(1) To provide a novel and improved shear back-gauging system;

(2) To provide a novel and improved shear back-gauging system that is power driven;

(3) To provide a novel and improved shear back-gauging system that is supported by the side housings of the shear machine;

(4) To provide a novel and improved shear back-gauging system that may easily be removed from the plane of the work to enable shearing of large pieces from the work;

(5) To provide a novel and improved shear back-gauging system that eliminates wedging;

(6) To provide a novel and improved shear back-gauging system that eliminates variable eccentric loading;

(7) To provide a novel and improved shear back-gauging system with a stop of uniform design.

Additional objects of my invention will be brought out in the following description of a preferred embodiment of the same, taken in conjunction with accompanying drawings, wherein FIG. 1 is a front view in elevation of a shear machine in which the invention is installed;

Figure 1:
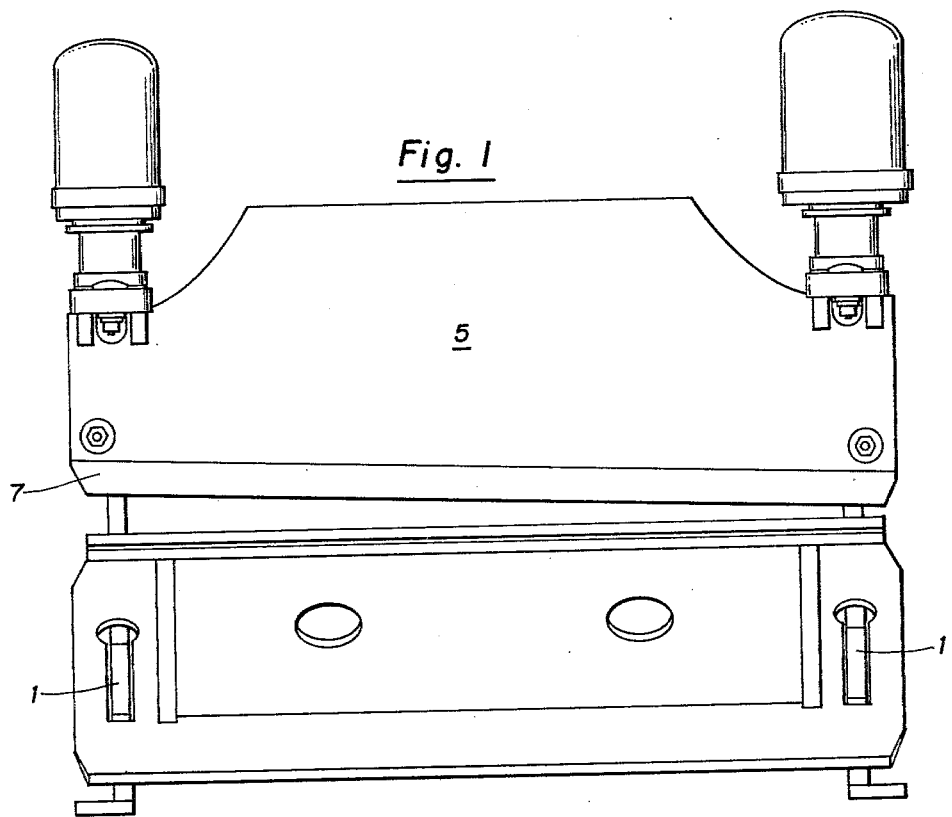
Figure 2:
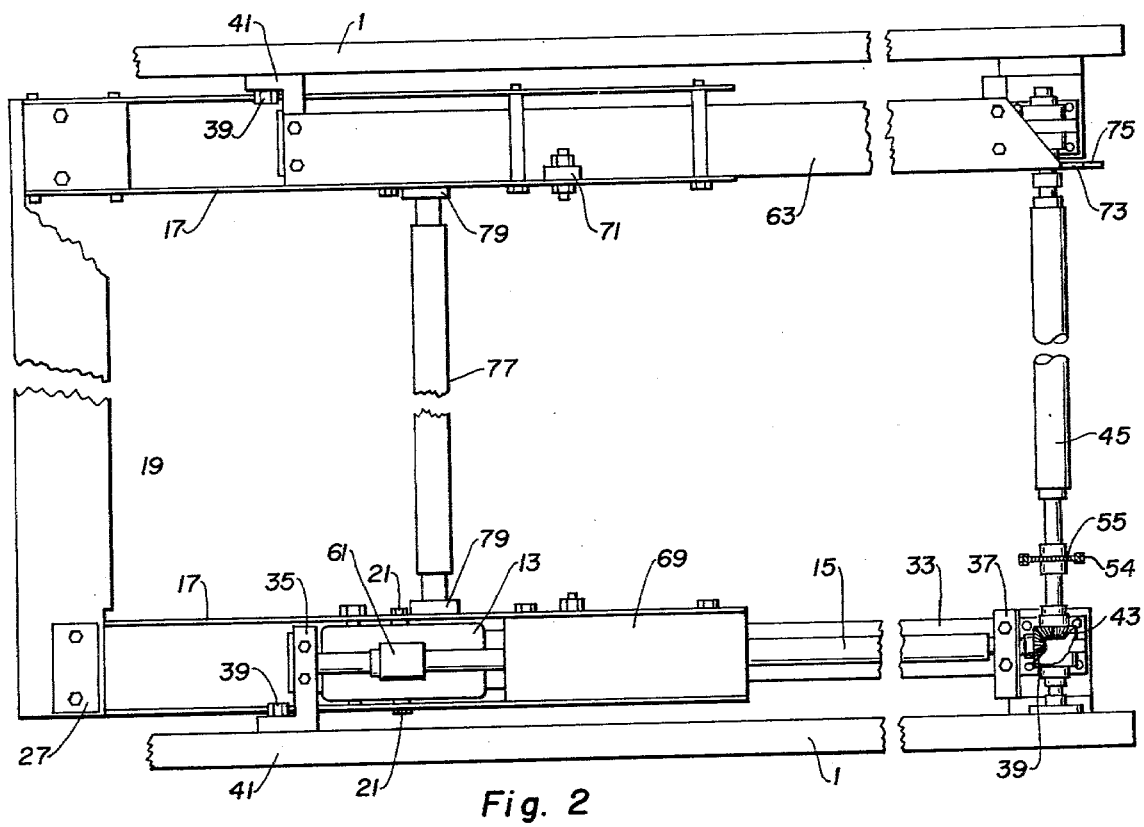
FIG. 2 is a plan view of a back-gauge assembly of the invention as installed in a machine such as that of FIG. 1.

Referring to the drawings for details of my invention in its preferred form, the same is illustrated as applied to a shear machine having side housings 1, a lower fixed knife element 3, a reciprocally mounted ram assembly 5 carrying an upper knife 7 at a rake angle in shearing relationship to the lower knife element and adapted to cooperate therewith in performing shearing operations on work, and a back-gauge assembly (FIG. 2) for ease of setting up work in the machine for shearing.

The back-gauge assembly includes a guide assembly installed on each of the side housings, and each containing a movable saddle 13 in screw drive connection with screw 15 of substantially the length of the guide assembly, thus giving the saddle traveling capability in both directions responsive to rotation of the screw drive.

A pair of carriage arms 17, each pivotally connected at an intermediate point by a pivot connection 21 to one of the saddles, supports a back-gauge stop 19 between its ends closest to the upper knife. This imparts to the stop the capability of horizontal movement toward and away from the shear, and rotatable movement about the carriage arm pivot connection.

Figure 3:
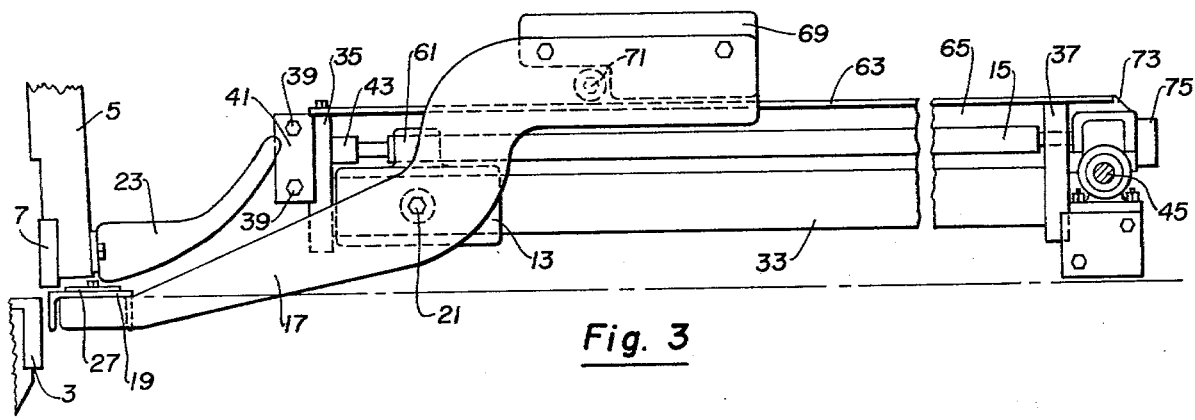
FIG. 3 is a side view in elevation depicting a carriage arm of a back-gauge assembly, in its forwardmost position prior to a shearing cycle.
Figure 4:
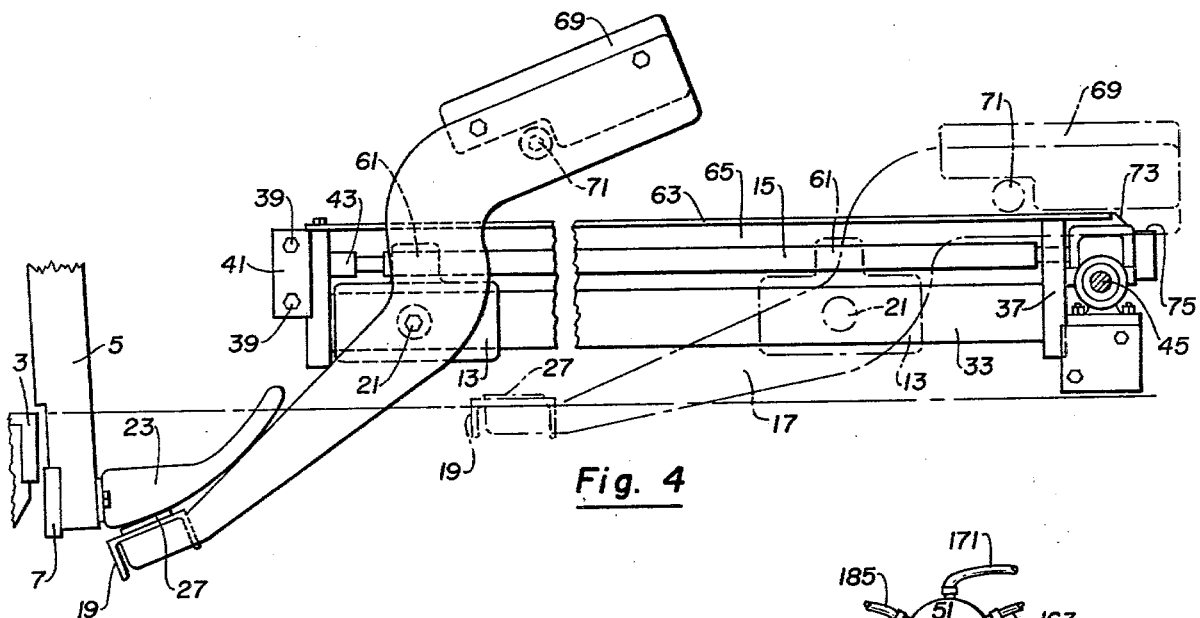
FIG. 4 is a side view in elevation as in FIG. 3, depicting the carriage arm in its forwardmost position during a shearing cycle, and further depicting the carriage arm in phantom at an intermediate point along its adjustment range.

In the forward range of adjustments (FIG. 3), the stop must be moved out of the way of the ram assembly 5 during the shearing stroke, and may be moved back to prevent wedging of the work between the lower shear knife element and the stop. To this end, a push arm 23, bolted to the back of the ram assembly at its lower rake angle end, and in alignment with one of the carriage arms, travels down with the upper knife, contacts a wear plate 27 on the stop, and imparts a rotational movement to the stop about the carriage arm pivot axis, a vertical component of the movement moving it ahead of the upper ram, and a rearward component further separating the stop from the lower knife and thereby releasing any piece of work that may otherwise have become wedged.

The guide assemblies includes a guide tube or other suitable track means 33, supported by means of a front end mounting 35 and rear end mounting 37 and secured in spaced relationship to the proximate side housings by means of bolts 39 through brackets 41 affixed to the side housings.

The drive screw 15, disposed above and spaced from the guide tube, terminates in a shaft bearing housing 43 in the front end mounting. The opposite end passes through an opening in the rear end mounting 37, where a beveled gear 39, keyed to the screw shaft, is meshed with a second beveled gear 43 at right angles thereto.

A common drive shaft 45, keyed with both second beveled gears, provides a drive connection between the two screws.

Supported by a mounting bracket from one of the side housings, is a two speed, bi-directional hydraulic motor assembly 51 with an external sprocket 53 on its drive shaft in chain connection 54 with another sprocket 55 keyed to the common drive shaft 45 between the two drive screws, providing synchronized clockwise or counterclockwise rotational motion to the screws as desired.

The saddle 13, slidably supported on the guide tube 33 has an extension 61 through which is a threaded passage in a screw engagement with the drive screw 15, such that the saddle will move along the guide tubes in a direction determined by the rotation of the screws.

Covering the guide assembly, is a screw housing secured to the front and rear mountings. The housing includes a horizontal upper surface component 63 over the full length of the screw, and downwardly directed side wall 65 from its edge opposite the side housing, from the front end mounting to substantially the rear end of the side housing.

Each of the carriage arms 17, involves an identical pair of spaced parallel components, each adjacent a different side of the guide assembly. The upper portion of each carriage arm includes a rearward weighted extension 69; the lower or forward ends of the carriage arms being connected by the back-gauge stop 19.

The push arm 23 has an arcuate lower edge, the lowest point being substantially on the same plane as the cutting edge of the uper knife. With adjustments of the back-gauge stop in proximity to the knives, downward movement of the ram assembly during a shearing cycle, will cause some point on this arcuate edge of the push arm to contact a wear plate 27 on the proximate end of the stop, urging the gauge into motion about the aforementioned pivot point.

At intermediate points along its range of travel, beyond the reach of the push arm and before its rearwardmost position, the back-gauge requires no push arm as the longer sheared pieces experience very little distortion during shearing and, aided by their weight, there is very little tendency for them to wedge between the lower knife and the stop.

The weighted extension 69, imparts rotational motion to the back stop in opposition to the movement imparted by the push arm, such that when the upper knife holder is withdrawn to its normally up position, the back-gauge stop will return to the plane of the work.

A roller 71 is secured by a bolt, through a vertical adjustment slot in the inside component of each carriage arm, and in alignment with the side wall of the screw housing 65, to reduce the frictional forces against the back-gauge assembly when adjustment from one position to another. This roller, being on the rearward weighted extension is lifted from the screw housing when the back-gauge is forced down by the push arm, and functions as a stop to align the gauge in the plane of the work when the weight returns the back-gauge to its normal position at the end of a shearing operation.

A downward slope 73, terminating in a rest stop 75, in the top rear corner of the side wall of the screw housing, provides a cam surface in line with the roller path of travel. At the rearwardmost adjustment position of the carriage assembly, the roller rides down the cam surface, causing the back-gauge stop to be rotated upward to a position above the plane of any work inserted between the knives, such that material may be sheared which is longer than the range of the back-gauge, or work may be removed from the rear of the machine.

A torsion bar 77 carries a bracket plate 79 at each end which is secured to the inside component of each carriage arm. Rotational motion caused by the push arm to one side of the carriage assembly, is thus simultaneously transmitted through this torsion bar to the opposite side of the assembly, thereby assuring that both sides of the carriage assembly react simultaneously to the same drive force.

Control of the shear is first initiated through a cycle-up sequence involving a three position key operated switch 85 containing three sets of contacts.

A first set of contacts 87, 89 is in circuit with a motor starter 97 and normally closed motor overload contacts 99, 101, 103, associated respectively with the circuit breakers 105, 107, 109 in the three line phases. A second set of contacts 91, 93 in the switch 85 are in circuit with a power relay 123, a reset pushbutton 125, and the normally closed contacts 127, 129 of of an "Emergency Return" pushbutton 130. A third set of switch contacts 94, 96 is involved in circuit with a drive-up relay 135, limit switches 134, 136, 138, 140 and a switch 142 of the foot operated type used for initiation of a shearing cycle.

Cycle-up is accomplished first by turning the three position key operated switch 85 from an off position 88, where no contacts are closed, to a first position 90, where the first and second sets of contacts are closed.

Depressing a start push-button 95 with the key in the first position, completes a circuit from line L1 of a power source, through motor starter 97, the first set of contacts 87, 89 of the key switch 85, the normally closed contacts of an emergency stop push-button 113 to power line L2 of the power source, thus activating the motor starter. The starter closes contacts 115, 117, 119 across a decreasing resistance in each of the three alternating current phases, bringing the motor 122 up to full speed.

Holding contacts 121 on the motor starter, close when the starter is activated and complete a holding circuit around the start push-button 95 and the switch assembly 85.

Motor starter holding contacts 121 also complete a circuit through power relay 123 upon depression of a reset push-button 125. This circuit is from the ground source line L1, through the power relay 123, the normally closed contacts 127, 129 of the emergency return push-button, the reset push-button 125, contacts 93, 91 of the switch assembly, holding contacts 121 of the motor starter, the emergency stop push-button 113, and to power line L2.

Activating the power relay 123, closes holding contacts 131 providing a holding circuit around the reset push-button 125 when it is released.

The power relay has normally open contacts 133 in series with the common power line return path of the drive-up relay 135, drive-down relay 137, single stroke relay 139, and a rake and back-gauge adjustment relay 141, preventing activation of these relays unless the motor is running and the power relay has been activated.

The drive-up relay 135, drive-down relay 137, and single stroke relay 139 are not part of the present invention nor are the foot switch 142 and limit switches 134, 136, 138, 140, all of which are concerned with controlling of the shearing cycle of the machine, and since description of their operation is not necessary for an understanding of the invention, further description is not deemed nececcary at this time.

With the shear machine at idle, power relay 123 alone is activated. The back-gauge adjustment relay 141 is activated by depressing a back-gauge control "IN" push-button having normally closed contacts 179, 181 and normally open contacts 147, 149, such that a circuit is completed from the ground source line L1, through the back-gauge adjustment relay 141, normally closed contacts 143, 145 of a rake adjustment push-button 146, the "IN" push-button contacts 147, 149 which are now closed, and the now closed power relay contacts 133 to the power line.

With the back-gauge adjustment relay 141 thus activated, normally closed contacts 151 associated therewith and in series with the drive-up, drive-down, and single stroke relays, open, thereby preventing any of these activities while back-gauge adjustment is taking place.

With the "IN" push-button depressed, a back-gauge "IN" direction solenoid 153 will be activated through a circuit from the ground source line L1, through the solenoid 153, the normally closed contacts 155, 157, of an "OUT" pushbutton, the now closed contacts 147, 149 of the "IN" pushbutton, and through the now closed contacts 133 of the power relay 123, to the power line.

Figure 5:
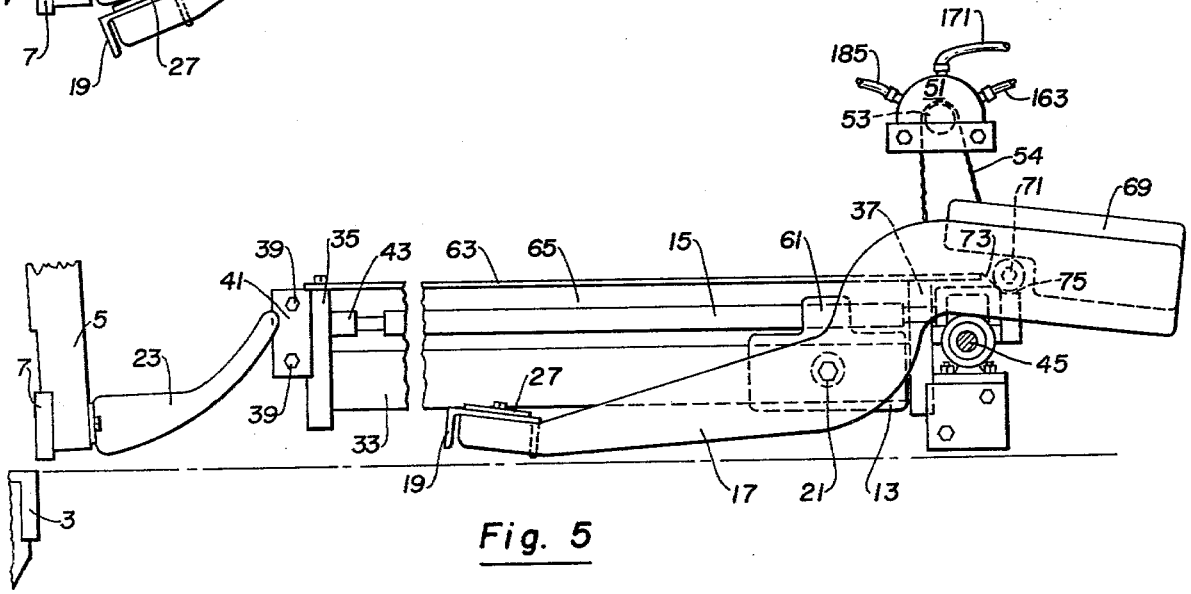
FIG. 5 is a side view in elevation as in FIG. 3, with the carriage arm at its rearwardmost adjustment.
Figure 6:
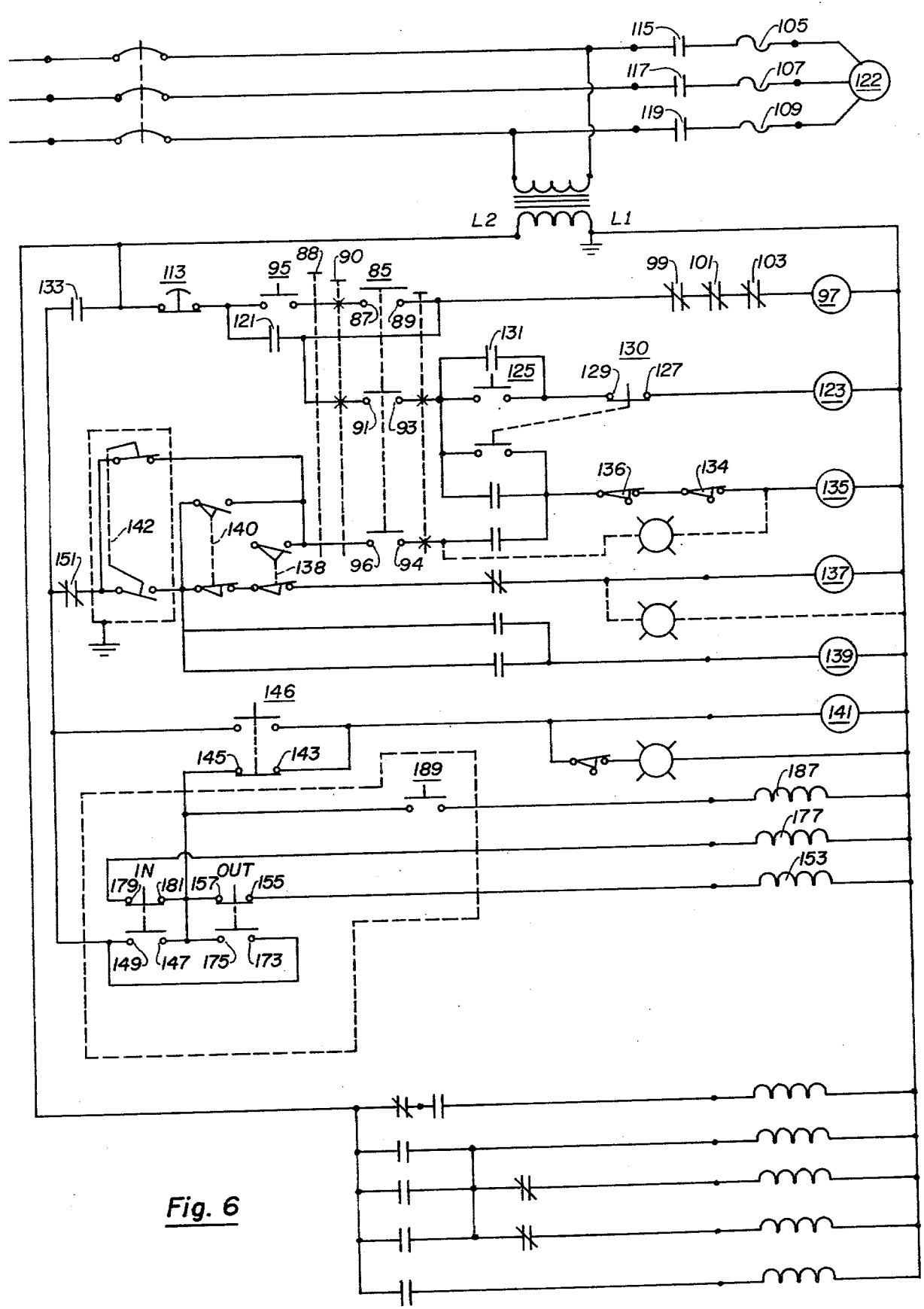
FIG. 6 is an electrical circuit diagram illustrating the back-gauge control circuitry as incorporated into the electrical circuitry of the machine.
Figure 7:
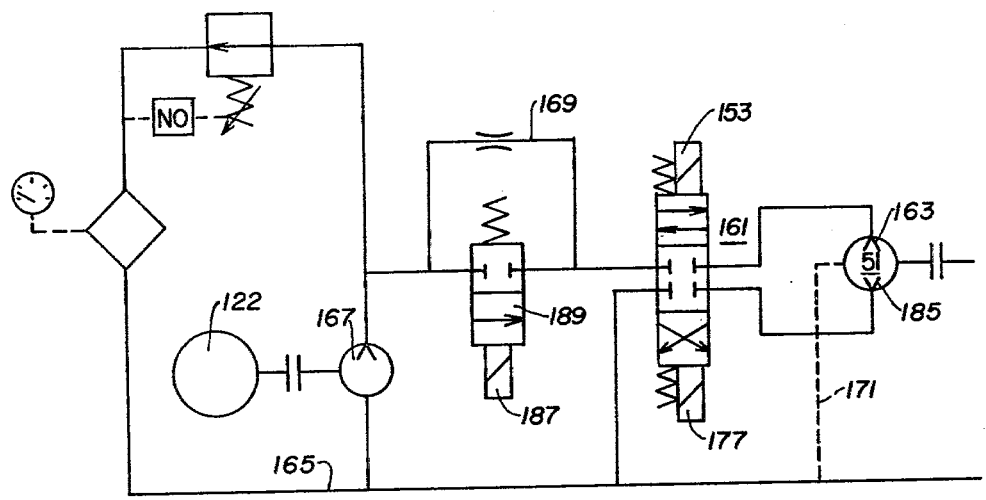
FIG. 7 is a hydraulic circuit diagram depicting hydraulic control circuitry relating to the back-gauge.

Activating the "IN" pilot solenoid 153, opens in one direction, a normally closed four way direction control valve assembly 161 (FIG. 7) completing a flow passageway to a first input 163 (FIGS. 5 & 7) of the hydraulic motor assembly 51. Fluid flow in this configuration is from a reservoir 165, through a pump 167 driven by the motor 122, via a constricted flow-path 169 to the direction control valve assembly 161, to hydraulic motor input 163, and from the motor exhaust 171 back to the reservoir 165.

Fluid flowing through the hydraulic motor from this first input 163, causes motor rotation to be such that the drive connected screws (FIG. 5) will drive the back-gauge stop in a direction toward the lower knife.

Closing normally open contacts 173, 175 on the "OUT" push-button, activates the "OUT" direction control pilot solenoid 177 through a circuit from the ground source line L1, through the solenoid 177, the normally closed contacts 179, 181 of the "IN" push-button, the now closed contacts 175, 173 of the "OUT" push-button, and through the now closed contacts 133 of the power relay 123 to the power source.

Activating the "OUT" pilot solenoid 177 opens a hydraulic flow path from the direction control valve assembly 161 (FIG. 7) to a second input 185 of the hydraulic motor 51 to reverse direction of rotation of this motor to cause reverse rotation of the screws 15. This, in turn, adjusts back-gauge to the rear away, from the knives.

The circuit involving the "IN" direction control valve pilot solenoid 153 is in series with normally closed contacts 155, 157 of the "OUT" push-button and the circuit involving the "OUT" direction control valve pilot solenoid is in series with the normally closed contacts 179, 181 of the "IN" push-button such that if the "IN" push-button is depressed, driving the motor in one direction, depressing the "OUT" push-button will drop out the "IN" solenoid circuit rather than causing both solenoids to be activated simultaneously, conversely, depressing the "IN" push-button while the "OUT" solenoid is activated, will cause the "OUT" solenoid circuit to be broken.

A circuit involving a back-gauge adjustment speed control valve pilot solenoid 187 and an activating push-button 189 is electrically in parallel with both the "IN" and "OUT" direction control valve solenoids 153 and 177 respectively. The back-gauge adjustment speed control valve pilot solenoid 187 may be activated by depressing the push-button 189 whenever either the "IN" or the "OUT" pushbutton is depressed.

Activating the backgauge adjustment speed control solenoid 187 opens the normally closed speed control valve 189 (FIG. 7) which, being in parallel to the contricted flow path 169 from the pump to the direction control valve assembly 161, increases the fluid flow path area and allows fluid flow at a faster rate to the motor with an ultimate realization of a greater number of revolutions per minute and resulting rapid adjustment of the back-gauge in either direction, as determined by the position to the valve assembly 161 at the time.

From the foregoing description of my invention in its preferred form, it will become apparent that the same is subject to alteration and modification, without departing from the interlying principles involved, and I do not desire to be limited in my protection to the specific details illustrated and described, except as may be necessitated by the appended claims.

I claim:

1. A back-gauge assembly for a shear machine having a reciprocally supported ram assembly with a shear knife affixed thereto for performing an operation on work, and a pair of side housings characterized by means carried on said side housings in a plane parallel to and above such work for horizontal adjustment of said back-gauge assembly.

2. A back-gauge assembly in accordance with claim 1, characterized by said horizontal adjusting means including a drive screw on each of said side housings, means coupling said drive screw to said back-gauge assembly and common means for actuating said drive screws.

3. An adjustable back-gauge assembly for a shear machine having side housings, a reciprocally mounted ram with a shear knife affixed thereto, a back-gauge stop included as part of said back-gauge assembly to physically intersect the plane of work for gauging purposes, pivotal lifting means to remove said back-gauge stop from the plane of said work when not needed, said pivotal lifting means comprising a pivotal support means for said back-gauge assembly, a weighted extension as part of and at the rear of said back-gauge assembly, and a downward sloping cam in travel alignment with the adjustment path of said assembly, whereby, the weighted extension overhanging said downward sloping cam, serves to rotate said back-gauge stop about said pivotal support means and above the plane of work inserted under said shear knife 4. In a shear machine having side housings and a reciprocally mounted ram driven from both ends and having a shear knife affixed thereto, a back-gauge assembly comprising a pair of carriage arms supporting between them a back-gauge stop in intersecting relationship with the plane of work inserted under said ram, means on said side housings supporting said back-gauge assembly, means for slidably adjusting said supporting means along a path normal to the plane of said ram and in a plane parallel to and above such work, and means responsive to rearward positioning of said back-gauge assembly beyond a certain point to rotate said back-gauge stop from the plane of such work when not to be used.

5. In a shear machine having side housings and a reciprocally mounted ram driven from both ends and having a shear knife affixed thereto, a back-gauge assembly comprising a pair of carriage arms supporting between them a back-gauge stop in intersecting relationship with the plane of work inserted under said ram means on said side housings supporting said back-gauge assembly; means for slidably adjusting said supporting means along a path normal to the plane of said ram in a plane parallel to and above such work, said means for slidably adjusting said supporting means including a drive screw on each of said side housings, a common drive means connected to said drive screws, and track means parallel to each of said drive screws; said support means including a saddle slidably resting on said track means and having a threaded extention for engagement with said drive screw, and a pivotal support at an intermediate location on said saddle for pivotal connection to said carriage arm and means responsive to rearward positioning of said back-gauge assembly beyond a certain point to rotate said back-gauge stop from the plane of such work when not to be used.

6. A shear machine in accordance with claim 5, characterized by said means responsive to rearward positioning of said back-gauge to rotate said back-gauge stop from the plane of work comprising a downward sloping cam as part of a housing over said drive screw in travel alignment with each of said carriage arms and a weight at the rear of each of said carriage arms supported by said screw housing during adjustment, whereby when said carriage arms are driven rearward by said adjusting means to the rearmost position, said weighted ends follow the direction of said downward sloping cams, rotating said back-gauge stop above the plane of work to be sheared.

* * * * *